Figure 1:
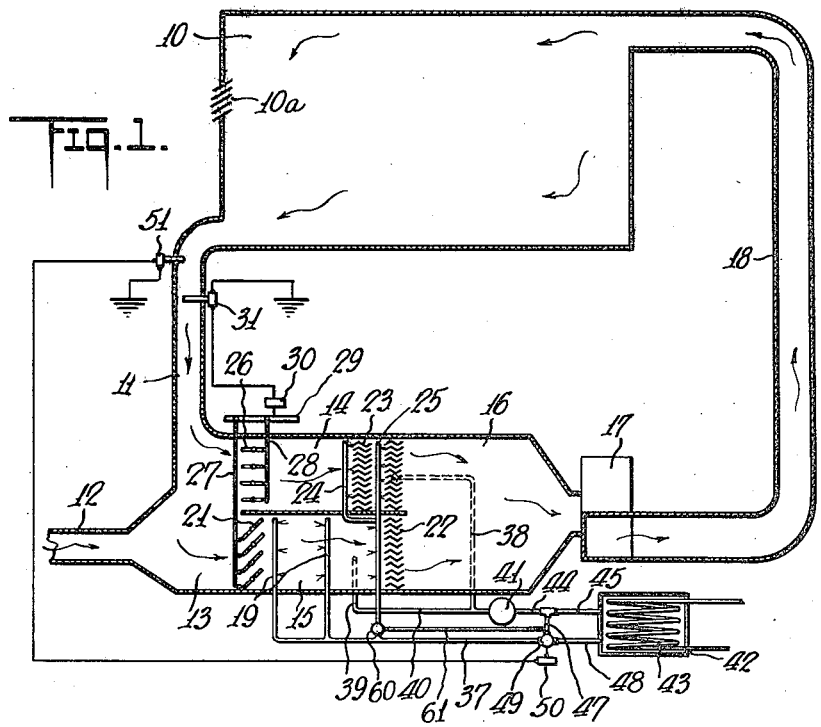

INVENTOR
William A. Evans
BY
Dean, Fairbank, Hirsch & Foster
ATTORNEYS

Patented June 16, 1936

2,044,352

UNITED STATES PATENT OFFICE 2,044,352

AIR CONDITIONING SYSTEM

William A. Evans, Maplewood, N. J.

Application May 5, 1934, Serial No. 724,035

11 Claims. (Cl. 62—6)

A common method of cooling and conditioning the air in an enclosure is to withdraw air therefrom, mix some of it with fresh air, pass the mixed air through a fully flooded washer or surface cooler, then mix this cold saturated stream with by-passed, untreated, withdrawn air and redeliver the mixture to the enclosure. The expedients heretofore resorted to for controlling such a system have over-cooled a portion of the air and have required a large amount, sometimes twice as much, withdrawn, untreated air for reheating the over-cooled portion. Only approximate control of temperature and relative humidity has been had by varying the proportions of treated and untreated (by-passed) air with the latter always large.

Such systems are unsatisfactory principally because they absorb excesses of both latent and sensible heat in one zone instead of distinguishing and separating the varying amounts of these excesses to be removed. Accurate control of relative humidity has been sacrificed because of this. Those systems moreover over-cool a large amount of air down to the dew point and tend to require lower temperatures and greater power consumption. Then where air washers are used for conditioning, those systems present the further disadvantage of large quantities of air by-passing the washer and not being treated for removal of dust and other impurities.

My present invention overcomes the above noted difficulties and provides a readily controllable system in which little or no untreated air is recirculated but in which over-refrigeration of the air and the consequent need for reheating is avoided.

The system disclosed in this application includes the air washer type of conditioner, that is water sprays and wetted surfaces for direct contact of air with water for cooling and scrubbing. The same cooling effect may be had by various forms of cooling coils in place of the sprays and cold scrubbers and my invention is intended to cover such systems.

Realizing that to attempt to control the temperature of the air passing through the washer by cutting the sprays in or out, or by similar expedients is impractical, I use a fully flooded washer through which the fresh air and part of the air withdrawn from the enclosure are passed. A variation in the amount of air passing through this washer has little effect upon the temperature of the air leaving it which will always be within a few degrees of the temperature of the cooling water.

This washer may be said to control latent heat absorption and by controlling only sensible heat absorption in a secondary cooler in parallel with the washer and then mixing the two air streams before they enter the enclosure, a very satisfactory control may be had. This control involves the simple expedient of regulating the relative amounts of air which pass through the latent heat control chamber and the sensible heat control chamber. Such regulation may be conveniently effected by providing sets of dampers to control the entrance to the two chambers and so interlocking and connecting the damper sets that the opening of one chamber is correlated with the closing of the other. These dampers may be controlled by a dry-bulb thermostat at any point in the system and if a wet bulb control is deemed necessary, such wet bulb may be used to control the temperature of the cooling water delivered to the sprays in the latent heat absorbing chamber.

While it is within the scope of the invention to use various types of cooling media in the sensible heat absorption chamber, I prefer to remove the excess sensible heat from the air passing therethrough by directing it over a cooling scrubber, the plates of which are kept cold and wet by streams or sprays of water whereby both solid and gaseous impurities in the air passing through the sensible heat absorption chamber are removed at the same time that the excess sensible heat is being absorbed. The temperature of the cooling water used in the sensible heat absorbing chamber may be kept constant by a separate temperature control valve or it may be at the same temperature as the water used in the latent heat control chamber. Furthermore the cooling water for the sensible heat absorbing zone may be from any source such as the city mains, deep wells or cooling towers.

Other objects of the invention are to provide an air conditioning system which utilizes extremely simple, practical, self-regulating, control apparatus, which is devoid of complex mechanism and which utilizes from a mechanical standpoint only cooling and dehumidifying instrumentalities of proven practicability.

The invention may be more fully understood from the following description in connection with the accompanying drawing wherein:—

Figure 2:
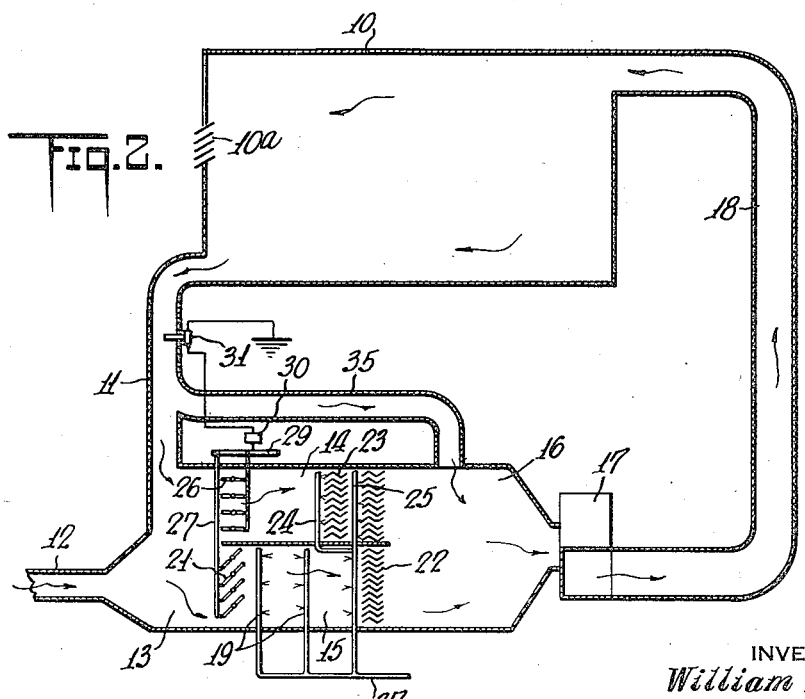

Fig. 1 is a diagrammatic plan view of an air conditioning system embodying the invention, and Fig. 2 is a similar view of a slightly modified type of system.

Referring first to Fig. 1, 10 represents an enclosure having a vent at 10a and 11 a conduit through which air is withdrawn from the enclosure. This conduit together with a fresh air inlet conduit 12 deliver to a mixing chamber 13 arranged at the inlet end of a pair of parallel air treating chambers 14 and 15, the latter discharging into a second mixing chamber 16 from which a fan 17 forces the air back to the enclosure 10 through a return conduit 18. The amount of fresh air introduced corresponds to the amount lost through vent 10a and the window or door openings of the enclosure.

The chamber 15 may be termed the latent heat absorption control chamber. It is in the nature of a standard air washer completely flooded by a series of sprays 19, or it may be a coil cooler. The inlet of chamber 15 is controlled by a set of dampers 21 and a conventional scrubber 22 is provided in the outlet of the chamber. The chamber 14 is used to control only sensible heat absorption and at its outlet end this chamber is provided with a number of scrubbers 23 arranged in series and with enough spray pipes 24 and 25 to keep the scrubber plates cold and wet and to form some spray mist when necessary.

A series of dampers 26 control the inlet to the chamber 14 and the dampers 26 and 21 are interlocked for simultaneous motion through the intermediacy of a pair of parallel links 27 and 28 connected to a common operating lever 29, the lever being controlled by a solenoid or air motor 30 connected to a dry bulb thermostat 31 arranged in the conduit 11 or at any other suitable point in the system. The damper sets 21 and 26 are so interconnected that the closing of one damper set is effected by the opening of another and vice-versa, the dampers thus regulating the proportion of air which passes through the respective chambers 15 and 14.

In operation all of the air which flows through the chamber 15 will have its temperature reduced below its dew point and latent heat will thus be extracted from such air. The air passing through the chamber 14 on the other hand will have some of the sensible heat removed and some of the physical impurities removed but will in no instance be reduced to dew point temperature.

Under typical operating conditions where for example the air within the enclosure is to be maintained at 80° and the heat load is such that a 15° differential temperature is required, 65° air should be supplied through the conduit 18. Then, assuming that 50° gives the desired dew point in the chamber 15, the system works out approximately as follows:—

About 25% of the air constituting a mixture of fresh and return air goes through the chamber 15 leaving it (in saturated condition with all sensible heat and some latent heat removed) at a temperature of 50°. Seventy-five percent of the air which is substantially all recirculated air goes through the chamber 14 where by removal of sensible heat its temperature is reduced to approximately 70° and all solid or gaseous impurities are removed. The resulting mixture gives a 65° temperature in the conduit 18. Assume further that the heat load in the room drops so that a 10° differential temperature is sufficient. Under these conditions air at 70° supplied through conduit 18 is adequately cold for conditioning purposes. The dry bulb thermostat 31 automatically operates the damper sets 21 and 26 to change the proportions of air passing through the chambers 15 and 14. The smaller amount of air now passing through chamber 15 will still emerge at a temperature of approximately 50° but the increase of the volume of air passing through the chamber 14 will raise the outlet temperature from that chamber to say 75° and the temperatures work out as follows:—

20% of the air passing through latent heat absorption chamber 15 at 50°; 80% of the air passing through the sensible heat control chamber at 75° and resultant 70° air flowing through the conduit 18.

Where it is found desirable to control wet bulb temperatures as well as dry bulb temperatures within the enclosure, a wet bulb thermostat is used to vary the temperature of the cooling water in chamber 15 while the cooling water in chamber 14 is kept constant by regulation.

A simple form of control mechanism to accomplish this has been illustrated. Spray pipes 19 and 25 are supplied from a common feed pipe 37 and the water from chambers 14 and 15 drains through pipes 38, 39 to a common return pipe 40 connected to the intake of a pump 41. A water cooler 42 chilled by the cold pipes 43 of any standard refrigeration system (not shown) is connected by pipe 45 to an outlet pipe 44 of the pump. The pipe 44 and the cooler 42 are both connected with the spray supply line 37 by pipes 47, 48 communicating with the supply line through a three way valve 49. The valve is movable to extreme or midway positions under the influence of an electrical or air actuating device 50 controlled from a wet bulb thermostat 51 arranged in the conduit 11 or at any other convenient point in the system. Thus depending on the wet bulb temperature at 51, valve 49 will be positioned to cause the pump 41 to pass return water or cooled water or a mixture of both to the sprays.

Inasmuch as it may prove desirable in many cases to keep the temperature of the water supplied to the sensible heat absorption chamber constant and only vary the temperature of the water supplied to the latent heat absorption chamber, I may employ a self-contained thermostatically controlled mixing valve 60 in the spray supply pipe 25. The valve 60 is connected by a pipe 61 to the line 47. Thus two sources of water at different temperature are available for the mixing valve and the thermostat control assures the delivery of water at uniform temperature to the sensible heat absorption chamber.

Conditions may exist where the range of temperature control afforded by the sensible heat control chamber 14 is not quite wide enough and a wider range may conveniently be afforded by creating a third zone in which no cooling takes place, in other words by by-passing an amount of unconditioned air which is relatively small as compared to the air flowing through the latent heat absorption control chamber, and the sensible heat absorption control chamber.

Fig. 2 illustrates such a system which is in all respects similar to Fig. 1 save for the introduction of a fixed area by-pass 35 connecting the conduit 11 and mixing chamber 16. While I prefer to utilize the system of Fig. 1 because of the simplicity of construction involved, Fig. 2 represents an alternative arrangement in which a fixed area by-pass may be employed. With this arrangement only a portion of the air is handled by the cooler and dehumidifier.

For instance, assuming again the same 80° requirement for the enclosure with a heat load of 15°, the fixed by-pass may carry typically 25% of the air in circulation and this air will be at 80°. 25% of the air may be passed through the chamber 15 at 50° and 50% through the chamber 14 at 65°, giving the desired 65° temperature in the return conduit 18.

Under a decreased heat load where the temperature of the air delivered to the enclosure need only be 70° to maintain the desired 80° temperature therein, by-pass 35 would still be carrying 25% of the air at 80° temperature, the air passing through the chamber 15 could be reduced to 20% which would emerge at 50° and the air passing through the chamber 15 increased to 55%, this air emerging at a temperature of say 72°.

Customarily the amount of fresh air admitted constituted from 15 to 20% of the total which is delivered through the pipe 18. Since practically all of this fresh air goes through the lower flooded washer, variations in the outside air temperature have little or no effect on the foregoing typical temperatures.

Where a supplemental wet bulb temperature control is required the system of Fig. 2 may be provided with a wet bulb thermostat to control cooling water temperatures as explained above in connection with the system of Fig. 1. Disclosure of the wet bulb thermostat and its controlled mechanism has been omitted in Fig. 2 since it may be identical with that shown in Fig. 1.

Having thus described my invention, what I claim as new and desire to secure by Letters Patent is:—

1. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, means in one chamber for absorbing excess latent heat of the air passing therethrough, means in the other chamber for absorbing substantially only excess sensible heat of the air passing therethrough and means for proportioning the percentages of said stream passing through the respective chambers.

2. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, means in one chamber for absorbing excess latent heat of and washing the air passing therethrough, means in the other chamber for absorbing substantially only excess sensible heat of the air passing therethrough and means for proportioning the percentages of said stream passing through the respective chambers, said latent heat absorbing chamber comprising a water cooled air cooler from which the air emerges at substantially the cooling water temperature.

3. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, means in one chamber for absorbing excess latent heat of the air passing therethrough, means in the other chamber for absorbing substantially only excess sensible heat of and washing the air passing therethrough and means for proportioning the percentages of said stream passing through the respective chambers, said sensible heat absorbing chamber having cooling means therein normally incapable of reducing the temperature of the air passing therethrough to the dew point.

4. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, liquid contact means in one chamber for absorbing excess latent heat of the air passing therethrough, liquid contact means in the other chamber for absorbing substantially only excess sensible heat of the air passing therethrough and means for proportioning the percentages of said stream passing through the respective chambers, said latent heat absorbing chamber comprising a water cooled air cooler from which the air emerges at substantially the cooling water temperature, said sensible heat absorbing chamber having cooling means therein normally incapable of reducing the temperature of the air passing therethrough to the dew point.

5. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, means in one chamber for absorbing excess latent heat of the air passing therethrough, means in the other chamber for absorbing substantially only excess sensible heat of the air passing therethrough and means for proportioning the percentages of said stream passing through the respective chambers, said proportioning means including sets of dampers controlling the admission of air to the respective chambers and means so connecting them that one set of dampers opens automatically as the other set closes and vice-versa.

6. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, means in one chamber for absorbing excess latent heat of the air passing therethrough, means in the other chamber for absorbing substantially only excess sensible heat of the air passing therethrough and means for proportioning the percentages of said stream passing through the respective chambers, a dry bulb thermostat controlling the division of the air stream.

7. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, means in one chamber for absorbing excess latent heat of the air passing therethrough, means in the other chamber for absorbing substantially only excess sensible heat of the air passing therethrough and means for proportioning the percentages of said stream passing through the respective chambers, and a by-pass for conducting a substantially invariant volume of air around the conditioning means.

8. In an air conditioning system of the type which includes means for withdrawing air from an enclosure, means for adding fresh air to the withdrawn air, means for conditioning the fresh air and withdrawn air and means for returning said conditioned air to the enclosure, said air conditioning means including a pair of chambers arranged in parallel through which a divided air stream of substantially invariant volume passes, means in one chamber for absorbing excess latent heat of the air passing therethrough, means in the other chamber for absorbing substantially only excess sensible heat of the air passing therethrough and means for proportioning the percentages of said stream passing through the respective chambers, the sensible heat absorption chamber including wet cold plates in the path of the air stream to remove impurities from the air and slightly cool the latter without dehumidifying the air.

9. In an air conditioning system an enclosure, a conduit for withdrawing air from the enclosure, a conduit for returning air to the enclosure, a conditioner unit connecting the two conduits, means for admitting fresh air into the withdrawn air in advance of the conditioner unit, said conditioner unit including a pair of air conditioning chambers arranged in parallel, a plurality of sprays in one of the chambers adapted to dehumidify and remove latent heat from the air passing through said chamber, a cooling unit in the other chamber capable of removing substantially only excess sensible heat of the air stream passing therethrough, a dry bulb thermostat and dampers controlled by said thermostat for proportioning the flow of air through the respective chambers.

10. In an air conditioning system an enclosure, a conduit for withdrawing air from the enclosure, a conduit for returning air to the enclosure, a conditioner unit connecting the two conduits, means for admitting fresh air into the withdrawn air in advance of the conditioner unit, said conditioner unit including a pair of air conditioning chambers arranged in parallel, a plurality of sprays in one of the chambers, adapted to dehumidify and remove latent heat from the air passing through said chamber, a cooling unit in the other chamber capable of removing substantially only excess sensible heat of the air stream passing therethrough, a dry bulb thermostat and dampers controlled by said thermostat for proportioning the flow of air through the respective chambers and a wet bulb thermostat for regulating the temperature of the spray water.

11. In an air conditioning system the combination with an enclosure, a conduit for withdrawing air from the enclosure, a conduit for returning air to the enclosure, three passageways connecting said conduits, one of said passageways comprising a substantially fixed volume by-pass through which air is recirculated, another of said passageways comprising an air washer for absorbing excess latent heat of the air passing therethrough and the third of said passageways having means therein to absorb substantially only excess sensible heat of the air passing therethrough, means for varying the relative amounts of air passed through the latent heat absorbing chamber and the sensible heat absorbing chamber whereby to control the temperature of the mixture which is passed back to the enclosure.

WILLIAM A. EVANS.